United States Patent

Jäger et al.

[11] Patent Number: 5,665,124
[45] Date of Patent: Sep. 9, 1997

[54] PROCESS FOR DYEING AND PRINTING MATERIALS CONTAINING HYDROXYL AND/OR CARBOXAMIDE GROUPS

[75] Inventors: Horst Jäger, Leverkusen; Joachim Wolff, Odenthal, both of Germany

[73] Assignee: Bayer Aktiengesellschaft, Leverkusen, Germany

[21] Appl. No.: 546,005

[22] Filed: Oct. 20, 1995

[30] Foreign Application Priority Data

Oct. 28, 1994 [DE] Germany .................... 44 38 544.7

[51] Int. Cl.$^6$ .................... C09B 67/24; D06P 1/38; D06P 3/10; D06P 3/66
[52] U.S. Cl. .................... 8/526; 8/527; 8/549; 8/688; 8/681; 8/918; 8/924; 8/532
[58] Field of Search .................... 8/526, 527, 549, 8/918–924, 681, 688

[56] References Cited

U.S. PATENT DOCUMENTS

| | | |
|---|---|---|
| 4,072,463 | 2/1978 | Schläfer et al. ................ 8/549 X |
| 4,725,675 | 2/1988 | Meininger et al. . |
| 4,879,372 | 11/1989 | Morimitsu et al. . |
| 5,037,965 | 8/1991 | Morimitsu et al. . |
| 5,233,026 | 8/1993 | Tzikas . |
| 5,250,670 | 10/1993 | Schläfer et al. ................ 534/642 |
| 5,292,870 | 3/1994 | Anderton . |
| 5,391,718 | 2/1995 | Tzikas et al. . |

FOREIGN PATENT DOCUMENTS

| | | |
|---|---|---|
| 0094055 | 11/1983 | European Pat. Off. . |
| 0267524 | 5/1988 | European Pat. Off. . |
| 0486176 | 5/1992 | European Pat. Off. . |
| 0559617 | 9/1993 | European Pat. Off. . |
| 1265698 | 4/1968 | Germany . |

Primary Examiner—Margaret Einsmann
Attorney, Agent, or Firm—Sprung Horn Kramer & Woods

[57] ABSTRACT

Dyeings having improved properties are obtained with a dyestuff of the following formula

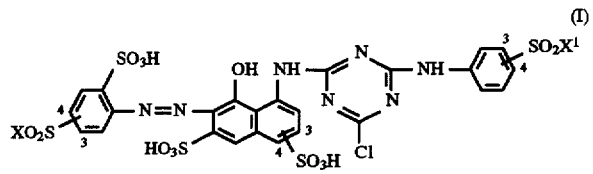

wherein the substituents have the meaning given in the description.

9 Claims, No Drawings

PROCESS FOR DYEING AND PRINTING MATERIALS CONTAINING HYDROXYL AND/OR CARBOXAMIDE GROUPS

The invention relates to a process for dyeing and printing materials containing hydroxyl and/or carboxamide groups with an azo reactive dyestuff.

Azo reactive dyestuffs are known from numerous publications, for example EP-A 32 187, EP-A 94 055, EP-A 305 021 and EP-A 318 968. In the dyeing process known from EP-A 318 968, the azo reactive dyestuffs used are substituted by a triazine group which is substituted not by a halogen atom but by a pyridino or amino group.

The present invention relates to a process for dyeing and printing materials containing hydroxyl and/or carboxamide groups with a reactive dyestuff, wherein the reactive dyestuff, in the form of the free acid, corresponds to the following formula,

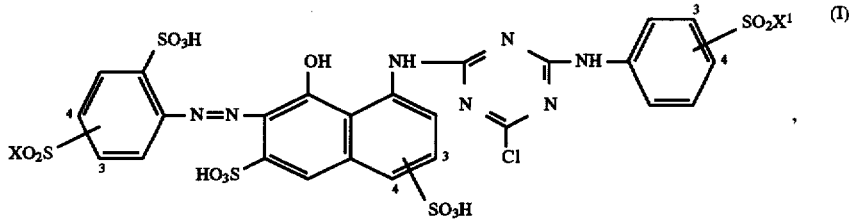

in which the radicals $SO_2X$ and $SO_2X^1$ and the second sulfo group in the radical of the aminonaphthol-disulfonic acid are each in the 3- or 4-position and X and $X^1$ denote $CH=CH_2$ or $CH_2CH_2Z$, in which Z denotes a substituent which can be split under dyeing conditions, and X and $X^1$ can be identical or different. Examples of Z are: $OSO_3H$, $S_2O_3H$, $OPO_3H_2$, $OCOCH_3$, $OSO_2CH_3$ or Cl.

In formula (I), the dyestuff in which the radical $SO_2X$ is in the 4-position, the sulfo group in the naphthalene nucleus is in the 3-position and the radical $SO_2X^1$ is in the 4-position is preferred.

The reaction conditions of the preparation correspond to the conditions customary in the field of acylation, diazotization and coupling. The dyestuffs are thus preferably prepared in an aqueous medium. Aminonaphtholsulfonic acids of the formula

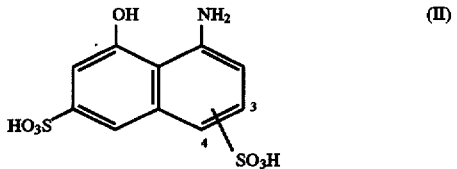

are thus subjected to a condensation reaction with cyanuric chloride in a weakly acid to acid aqueous medium and the resulting dichlorotriazine compound is combined in a weakly acid medium with a diazo compound obtainable by diazotization of an amine of the formula

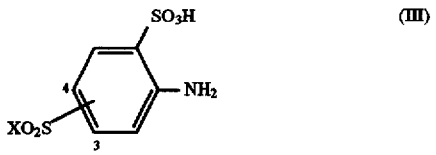

in which X has the meaning given. A chlorine atom in the resulting dichlorotriazine dyestuff is then replaced by heating at 30° to 50° C. in a neutral to weakly acid medium with an amine of the formula

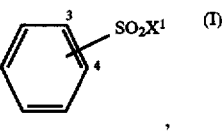

in which $X^1$ has the meaning given, the dyestuffs of the formula (I) being formed.

The reactive dyestuffs obtained by the processes described above are isolated in the customary manner by salting out, for example with sodium chloride or potassium chloride, or by evaporation of the neutral aqueous dyestuff solution, preferably at moderately elevated temperature and under reduced pressure or by spray drying. The dyestuffs can be employed both as solid finished formulations and as concentrated solutions.

In a preferred embodiment, the dyestuffs are used as granules. The granules of the dyestuffs can be obtained in the following steps:

Mixing granulation

In this process, the dyestuff powder is moistened with 15 to 55% of water—based on the powder mixture—and the mixture is subsequently shaped in a mixing granulator and then dried and the dust is removed, the dust removal agent being sprayed as an aerosol mixture onto the granules.

Spray granulation

In this process, the as-synthesized solution or suspension is simultaneously dried and granulated in a fluidizing spray dryer.

The dyestuff powders or granules in general comprise (in % by weight) 30 to 80% of a reactive dyestuff of the formula (I) and 5 to 15% of water, in each case based on the total composition. In addition, they can also comprise inorganic salts, such as alkali metal chlorides or alkali metal sulfates, dispersing agents and dustproofing agents.

Preferred solid mixtures additionally comprise buffer substances which give a pH of 3.5 to 7.5, in particular 4.5 to 6.5, when the mixtures are dissolved in 20 times the amount of water (based on the weight of the finished dyestuff formulation). These buffer mixtures are added in amounts of 3 to 50, in particular 5 to 15% by weight, based on the total weight.

Aqueous reactive dyestuff solutions in general comprise 5 to 50% of a dyestuff of the formula (I) (based on the total weight of the solution).

Preferred aqueous reactive dyestuff solutions additionally comprise buffer substances and have a pH of 3.5 to 7.5, in particular 4.5 to 6.5. These buffer substances are preferably added in amounts of 0.1 to 50%, in particular 1 to 20% by weight, based on the total weight.

The buffers used are inert towards the reactive groups. Examples of buffers are: sodium dihydrogen phosphate, disodium hydrogen phosphate, potassium dihydrogen phosphate, dipotassium hydrogen phosphate, sodium acetate, potassium acetate, sodium borate, potassium borate, sodium oxalate, potassium oxalate and sodium hydrogen phthalate. These buffers can be used by themselves or as a mixture.

The azo compounds (I) have valuable dyestuff properties. As a result of the two fiber-reactive groups $SO_2X$ and the chlorotriazinyl radical, they have fiber-reactive properties. Materials containing hydroxyl and/or carboxamide groups can be in the form of sheet-like structures, such as paper and leather, or of films, in bulk and/or in fibrous form.

The materials are preferably used in the form of fiber materials, in particular in the form of textile fibers, such as yarns, wound packages and woven fabrics.

Materials containing hydroxyl groups are those of natural or synthetic origin, such as, for example, cellulose fiber materials or regenerated products thereof and polyvinyl alcohols. Cellulose fiber materials are preferably cotton, but also other plant fibers, such as linen, hemp, jute and ramie fibers; regenerated cellulose fibers are, for example, staple viscose and filament viscose. Materials containing carboxamide groups are, for example, synthetic and naturally occurring polyamides and polyurethanes, in particular in the form of fibers, for example wool and other animal hair, silk, leather, polyamide 6,6, polyamide 6, polyamide 11 and polyamide 4.

The compounds of the general formula (I) can be applied to and fixed on the substrates mentioned, in particular on the fiber materials mentioned, by the application techniques known for water-soluble dyestuffs, in particular by those known for water-soluble fiber-reactive dyestuffs, especially mentioned are the exhaust method and the padding process.

Very good color yields are thus obtained with them on cellulose fibers by the exhaust method from a long liquor using the most diverse acid-binding agents and if appropriate neutral salts, such as sodium chloride or sodium sulfate. Dyeing is preferably carried out in an aqueous bath at temperatures between 60° and 105° C., if appropriate at temperatures up to 120° C., under pressure and if appropriate in the presence of customary dyeing auxiliaries. A procedure can be followed here in which the material is introduced into the warm bath, this is gradually heated to the desired dyeing temperature and the dyeing process is brought to a conclusion at this temperature. If desired, the neutral salts which accelerate exhaustion of the dyestuff can also be added to the bath only after the actual dyeing temperature has been reached.

Excellent color yields with a very good appearance of the goods are also obtained on cellulose fibers by the padding process because of the better solubility compared with pure vinyl sulfone dyestuffs, it being possible for the dyestuffs to be fixed in a customary manner by batching at room temperature or elevated temperature, for example up to about 60° C., by steaming or with dry heat.

Deep prints having a good contour status and a clear white background are likewise obtained by the customary printing processes for cellulose fibers, which can be carried out in one phase—for example by printing with a printing paste comprising sodium bicarbonate or another acid-binding agent and subsequent steaming at 100° to 103° C.—or in two phases—for example by printing with a neutral or weakly acid printing ink and subsequent fixing either by passing through a hot electrolyte-containing alkaline bath or by overpadding with an alkaline electrolyte-containing padding liquor, with subsequent batching or steaming or dry heat treatment of the material overpadded under alkaline conditions. The appearance of the prints depends only little on the varying fixing conditions.

For fixing by means of dry heat by the customary thermofixing processes, hot air of 120° to 200° C. is used. In addition to customary steam of 101° to 103° C., superheated steam and pressurized steam having temperatures of up to 160° C. can also be employed.

The agents which are acid-binding and effect fixing of the compound of the formula (I) on the cellulose fibers are, for example, water-soluble basic alkali metal and also alkaline earth metal salts of inorganic or organic acids or compounds which liberate alkali under the influence of heat. The alkali metal hydroxides and alkali metal salts of weak to moderately strong inorganic or organic acids may be mentioned in particular, alkali metal compounds preferably meaning the sodium and potassium compounds. Such acid-binding agents are, for example, sodium hydroxide, potassium hydroxide, sodium carbonate, sodium bicarbonate, potassium carbonate, sodium formate, sodium hydrogen phosphate, disodium hydrogen phosphate, sodium trichloroacetate, waterglass or trisodium phosphate.

By treatment of the compounds according to the invention with the acid-binding agents, if appropriate under the action of heat, the compounds (dyestuffs) according to the invention are bonded chemically to the cellulose fiber; they are distinguished by a high fixing yield on these fiber materials when used in dyeing and printing processes. After customary after-treatment by rinsing to remove non-fixed portions of dyestuff, the dyeings on cellulose show excellent wet-fastness, especially since non-fixed portions of dyestuff can easily be washed out because of their good solubility in cold water.

The dyeings and prints produced with the compounds of the general formula (I) according to the invention are distinguished by very clear shades. In particular, the dyeings and prints on cellulose fiber materials have a good light-fastness and very good wet-fastnesses, such as fastnesses to washing, milling, water, seawater, cross-dyeing and acid and alkaline perspiration, and furthermore a good fastness to pleating, fastness to ironing and fastness to rubbing.

The compounds of the general formula (I) according to the invention furthermore can also be used for fiber-reactive dyeing of wool. Felt-free wool or wool with a low-felt finish (cf., for example, H. Rath, Lehrbuch der Textilchemie, Springer-Verlag, 3rd edition (1972), pages 295 to 299, in particular finishing by the Hercosett process (page 298); J. Soc. Dyers and Colourists 1972, 93 to 99, and 1975, 33 to 44) can also be dyed with very good fastness properties.

The dyeing process on wool is carried out here in the customary and known dyeing procedure from an acid medium. Thus, for example, acetic acid and/or ammonium sulfate or acetic acid and ammonium acetate or sodium acetate are added to the dye bath in order to obtain the desired pH. To achieve a usable levelness of the dyeing, it is advisable to add customary leveling auxiliaries, such as, for example, those based on a reaction product of cyanuric chloride with 3 times the molar amount of an aminobenzenesulfonic acid and/or an aminonaphthalenesulfonic acid or based on a reaction product of, for example, stearylamine with ethylene oxide. Thus, for example, the compound of the general formula (I) is subjected to the exhaustion process preferably initially from an acid dye bath with a pH of about 3.5 to 5.5 and with control of the pH, and towards the end of the dyeing time the pH is then shifted into the neutral and if appropriate weakly alkaline range up to a pH of 8.5, in order to bring about the complete reactive bonding between the compound of the formula (I) and the fiber to achieve good depths of color in particular. At the same time, the portion of dyestuff which has not bonded reactively is detached.

The procedure described here also applies to the production of dyeings on fiber materials of other naturally occurring polyamides or of synthetic polyamides and polyurethanes. As a rule, the material to be dyed is introduced into the bath at a temperature of about 40° C. and agitated therein for some time, the dye bath is then readjusted to the desired weakly acid, preferably weakly acetic acid, pH and the actual dyeing is carried out at a temperature of between 60° and 98° C. However, the dyeings processes can also be carried out at the boiling point or in closed dyeing apparatus at temperatures of up to 106° C. Since the water-solubility of the compounds of the general formula (I) is very good, they can also advantageously be employed in customary continuous dyeing processes. The tinctorial strength of the compounds of the general formula (I) according to the invention is very high.

On the materials mentioned, preferably fiber materials, the monoazo dyestuffs (I) produce very bright, red dyeings having surprisingly good light- and chlorine-fastnesses.

The formulae shown are those of the corresponding free acids. The dyestuffs were in general isolated and employed for dyeing in the form of alkali metal salts, in particular the Na salts.

EXAMPLES

Example 1 a) Acylation of H-acid with cyanuric chloride

A neutral solution of 31.8 g of 1-amino-8-hydroxynaphthalene-3,6-disulfonic acid (H-acid) in 200 ml of water is added dropwise to a suspension of 18.5 g of cyanuric chloride and 0.1 g of a wetting agent in 200 ml of ice-water. The mixture is stirred at 10° to 12° C. for about 2 hours until H-acid can no longer be detected.

b)

36.1 g of 4-(β-sulfatoethylsulfonyl)aniline-2-sulfonic acid are stirred into 500 ml of ice-water, and 28 ml of 30% strength hydrochloric acid are added. 70 ml of 10% strength sodium nitrite solution are then added dropwise and the mixture is stirred until only a slight excess of nitrite is still to be detected. This is then destroyed with amidosulfonic acid.

c)

The diazo compound obtained according to b) is added to the solution obtained according to a). A pH of 3–5 is established by sprinkling in sodium bicarbonate and the mixture is stirred until the diazo compound can no longer be detected.

d)

28.1 g of 4-(β-sulfatoethylsulfonyl)aniline are added to the azo dyestuff obtained according to c) and the temperature is brought to 40° C., a pH of 4.5 being maintained by sprinkling in bicarbonate. After the mixture has been stirred for several hours, the condensation has ended. To isolate the product, 20% by volume of potassium chloride is added to the solution of the dyestuff. The resulting precipitate is filtered off with suction, dried at 70° C. in a circulating air drying cabinet and ground. A red powder which is readily soluble in water is obtained. The dyestuff corresponds to the following formula:

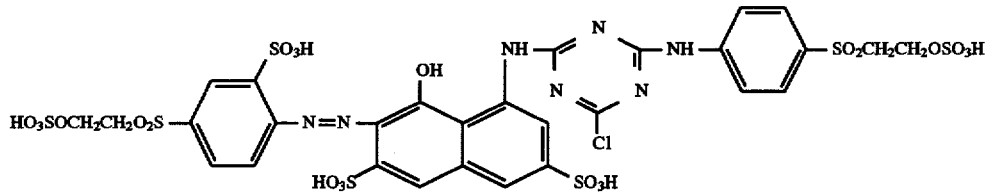

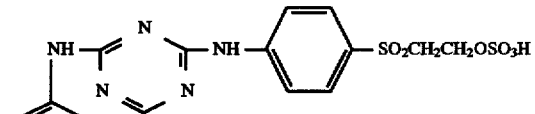

$\lambda_{max} = 512$ nm.

Further dyestuffs are obtained according to the instructions of this example if equivalent amounts of the components listed in the following table are used in stage a), b) and d).

TABLE

| Ex. | Stage a) | Stage b) | Stage c) | $\lambda_{max}$ nm |
|---|---|---|---|---|
| 2 | 1-Amino-8-hydroxynaphthalene-4,6-disulfonic acid | 4-(β-Sulfatoethylsulfonyl)-aniline-2-sulfonic acid | 4-(β-Sulfatoethylsulfonyl)-aniline | 501 |
| 3 | 1-Amino-8-hydroxynaphthalene-4,6-disulfonic acid | 4-(β-Sulfatoethylsulfonyl)-aniline-2-sulfonic acid | 3-(β-Sulfatoethylsulfonyl)-aniline | 502 |
| 4 | 1-Amino-8-hydroxynaphthalene-4,6-disulfonic acid | 5-(β-Sulfatoethylsulfonyl)-aniline-2-sulfonic acid | 3-(β-Sulfatoethylsulfonyl)-aniline | 503 |
| 5 | 1-Amino-8-hydroxynaphthalene-4,6-disulfonic acid | 5-(β-Sulfatoethylsulfonyl)-aniline-2-sulfonic acid | 4-(β-Sulfatoethylsulfonyl)-aniline | 503 |
| 6 | 1-Amino-8-hydroxynaphthalene-3,6-disulfonic acid | 5-(β-Sulfatoethylsulfonyl)-aniline-2-sulfonic acid | 4-(β-Sulfatoethylsulfonyl)-aniline | 513 |
| 7 | 1-Amino-8-hydroxynaphthalene-3,6-disulfonic acid | 5-(β-Sulfatoethylsulfonyl)-aniline-2-sulfonic acid | 3-(β-Sulfatoethylsulfonyl)-aniline | 513 |
| 8 | 1-Amino-8-hydroxynaphthalene-3,6-disulfonic acid | 4-(β-Sulfatoethylsulfonyl)-aniline-2-sulfonic acid | 3-(β-Sulfatoethylsulfonyl)-aniline | 512 |

Dyeing instructions I 2 parts of the dyestuff obtained according to Example 1 are dissolved in 400 parts of water; 1,500 parts of a solution comprising 53 g of sodium chloride per liter are added. 100 parts of a cotton fabric are introduced into this dye bath at 40° C. After 45 minutes, 100 parts of a solution comprising 16 g of sodium hydroxide and 20 g of calcined sodium carbonate per liter are added. The temperature of the dye bath is kept at 40° C. for a further 45 minutes. Thereafter, the dyed goods are rinsed, soaped at the boil with a nonionic detergent for a quarter of an hour, rinsed again and dried.

Dyeing instructions II 2 parts of the reactive dyestuff obtained according to Example 1 are dissolved in 400 parts of water; 1,500 parts of a solution comprising 53 g of sodium chloride per liter are added. 100 parts of a cotton fabric are introduced into this dye bath at 35° C. After 205 minutes, 100 parts of a solution comprising 16 g of sodium hydroxide and 20 g of calcined sodium carbonate per liter are added. The temperature of the dye bath is kept at 35° C. for a further 15 minutes. Thereafter, the temperature is increased to 60° C. in the course of 20 minutes. The temperature is kept at 60° C. for a further 35 minutes. Thereafter, the goods are rinsed, soaped at the boil with a nonionic detergent for a quarter of an hour, rinsed again and dried.

Dyeing instructions III 8 parts of the reactive dyestuff obtained according to Example 1 are dissolved in 400 parts of water; 1,400 parts of a solution comprising 100 g of sodium chloride per liter are added. 100 parts of a cotton fabric are introduced into this dye bath at 25° C. After 10 minutes, 200 parts of a solution comprising 150 g of trisodium phosphate per liter are added. The temperature of the dye bath is increased to 60° C. in a course of 10 minutes. The temperature is kept at 60° C. for a further 90 minutes. Thereafter, the goods are rinsed, soaped at the boil with a nonionic detergent for a quarter of an hour, rinsed again and dried.

Dyeing instructions IV 4 parts of the reactive dyestuff obtained according to Example 1 are dissolved in 50 parts of water. 50 parts of a solution comprising 5 g of sodium hyroxide and 20 g of calcined sodium carbonate per liter are added. A cotton fabric is padded with the resulting solution such that it increases by 70% of its weight, and is then wound up on a batching roller. The cotton fabric is stored in this manner at room temperature for 3 hours. Thereafter, the dyed goods are rinsed, soaped at the boil with a nonionic detergent for a quarter of an hour, rinsed again and dried.

Dyeing instructions V 6 parts of the reactive dyestuff obtained according to Example 1 are dissolved in 50 parts of water. 50 parts of a solution comprising 16 g of sodium hydroxide and 0.04 liter of waterglass per liter are added. A cotton fabric is padded with the resulting solution such that it increases by 70% of its weight, and is then wound up on a batching roller. The cotton fabric is stored in this manner at room temperature for 10 hours. Thereafter, the dyed goods are rinsed, soaped at the boil with a nonionic detergent for a quarter of an hour, rinsed again and dried.

Dyeing instructions VI 2 parts of the reactive dyestuff according to Example 1 are dissolved in 100 parts of water with addition of 0.5 part of sodium m-nitrobenzenesulfonate. A cotton fabric is impregnated with the resulting solution such that it increases by 75% of its weight, and is then dried. The fabric is then impregnated with a solution, warmed to 20° C., comprising 4 g of sodium hydroxide and 300 g of sodium chloride per liter and squeezed off to a weight increase of 75%, and the dyeing is steamed at 100° to 102° C. for 30 seconds, rinsed, soaped in a 0.3% strength boiling solution of a nonionic detergent for a quarter of an hour, rinsed and dried.

Printing instructions I 3 parts of the reactive dyestuff obtained according to Example 1 are sprinkled, while stirring rapidly, into 100 parts of a stock thickener comprising 50 parts of 5% strength sodium alginate thickener, 27.8 parts of water, 20 parts of urea, 1 part of sodium m-nitrobenzenesulfonate and 1.2 parts of sodium bicarbonate. A cotton fabric is printed with the printing paste thus obtained, and the resulting printed material is dried and steamed at 102° C. in saturated steam for 2 minutes. The printed fabric is then rinsed, soaped at the boil and rinsed again if appropriate, and then dried.

Printing instructions II 5 parts of the reactive dyestuff obtained according to Example 1 are sprinkled, while stirring rapidly, into 100 parts of a stock thickener comprising 50 parts of 5% strength sodium alginate thickener, 36.5 parts of water, 10 parts of urea, 1 part of sodium m-nitrobenzenesulfonate and 2.5 parts of sodium bicarbonate. A cotton fabric is printed with the printing paste thus obtained, the stability of which meets technical requirements, and the resulting printed material is dried and steamed in saturated steam at 102° C. for 8 minutes. The printed fabric is then rinsed, soaped at the boil and rinsed again if appropriate, and then dried.

We claim:

1. A process for dyeing and printing materials containing hydroxyl groups, carboxamide groups or both, with a reactive dyestuff, which comprises applying to said materials a reactive dyestuff which, in the form of the free acid, corresponds to the following formula

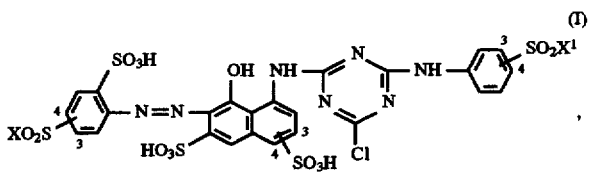

in which the radicals $SO_2X$ and $SO_2X^1$ and the second sulfo group in the radical of the aminonaphthol-disulfonic acid are each in the 3- or 4-position and X and $X^1$ denote $CH=CH_2$ or $CH_2CH_2Z$, in which Z denotes a substituent which can be split under dyeing conditions, and X and $X^1$ can be identical or different.

2. The process as claimed in claim 1, wherein Z is $OSO_3H$, $S_2O_3H_2$, $OPO_3H$, $OCOCH_3$, $OSO_2CH_3$ or Cl.

3. The process as claimed in claim 1, wherein the radicals $SO_2X$ and $SO_2X^1$ are in the 4-position and the second sulfo group in the naphthalene nucleus is in the 3-position.

4. The process as claimed in claim 1, wherein the dyestuff corresponds to the following formula

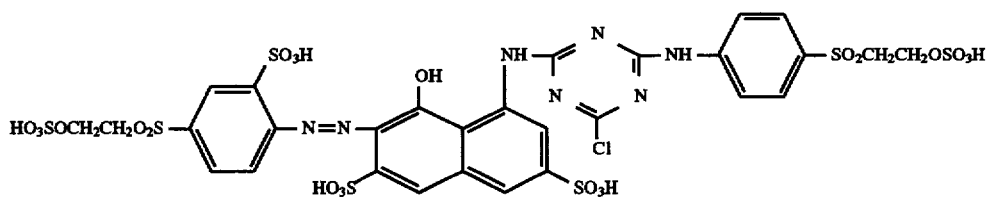

5. The process as claimed in claim 1, wherein the dyeing is carried out by the exhaust method.

6. A process as claimed in claim 1, wherein dyeing is carried out by the padding method.

7. A dyed or printed substrate which has bee at least partly dyed or printed with a reactive dyestuff which, in the form of the free acid, corresponds to the following formula

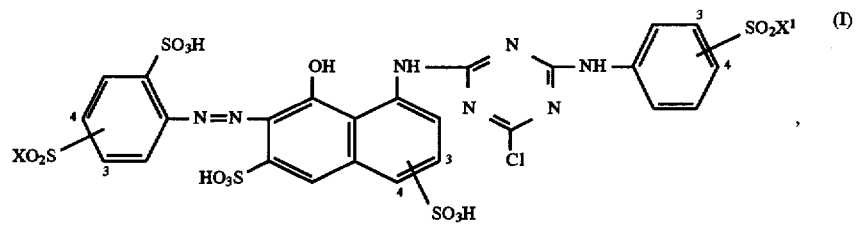

in which the radicals $SO_2X$ and $SO_2X^1$ and the second sulfo group in the radical of the aminonaphthol-disulfonic acid are each in the 3- or 4-position and X and $X^1$ denote $CH=CH_2$ or $CH_2CH_2Z$, in which Z denotes a substituent which can be split under dyeing conditions, and X and $X^1$ can be identical or different.

8. A dyestuff powder or dyestuff granules comprising (in % by weight) 30 to 80% of a reactive dyestuff which, in the form of the free acid, corresponds to the following formula

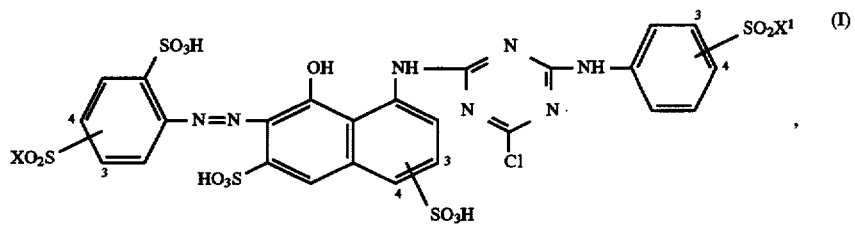

in which the radicals $SO_2X$ and $SO_2X^1$ and the second sulfo group in the radical of the aminonaphthol-disulfonic acid are each in the 3- or 4-position and X and $X^1$ denote $CH=CH_2$ or $CH_2CH_2Z$, in which Z denotes a substituent which can be split under dyeing conditions, and X and $X^1$ can be identical or different, 3 to 50% of a buffer and 5 to 15% of water, based on the total composition.

9. An aqueous reactive dyestuff solution comprising (in each case based on the total weight of the solution) 5 to 50% of a dyestuff which, in the form of the free acid, corresponds to the following formula

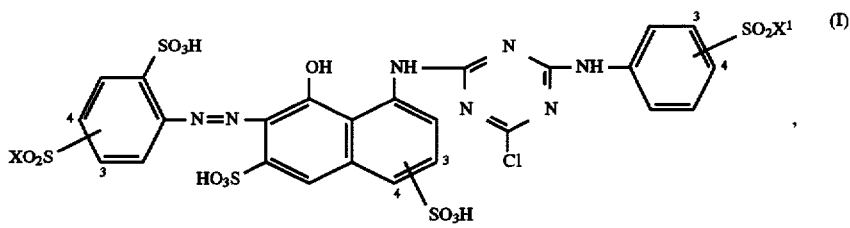

in which the radicals $SO_2X$ and $SO_2X^1$ and the second sulfo group in the radical of the aminonaphthol-disulfonic acid are each in the 3- or or 4-position and X and $X^1$ denote $CH=CH_2$ or $CH_2CH_2Z$, in which Z denotes a substituent which can be split under dyeing conditions, and X and $X^1$ can be identical or different, and 0.1 to 50% of a buffer, the solution having a pH of 3.5 to 7.5.

* * * * *

UNITED STATES PATENT AND TRADEMARK OFFICE
CERTIFICATE OF CORRECTION

PATENT NO. : 5,665,124
DATED : September 9, 1997
INVENTOR(S) : Jager, et al.

It is certified that error appears in the above-indentified patent and that said Letters Patent is hereby corrected as shown below:

Col. 9, line 1    Delete " bee " and substitute
                  -- been --

Signed and Sealed this

Thirtieth Day of June, 1998

Attest:

BRUCE LEHMAN

*Attesting Officer*    *Commissioner of Patents and Trademarks*